United States Patent [19]

Simkowski

[11] Patent Number: 5,501,553
[45] Date of Patent: Mar. 26, 1996

[54] DEVICE UTILIZING FLUID FOR EFFECTING NESTED ALIGNMENT OF ARTICLES AND PARTICULARLY UNDECORATED CANS

[75] Inventor: Donald J. Simkowski, Loveland, Colo.

[73] Assignee: Goldco Industries, Inc., Loveland, Colo.

[21] Appl. No.: 257,199

[22] Filed: Jun. 9, 1994

Related U.S. Application Data

[63] Continuation-in-part of Ser. No. 999,464, Dec. 29, 1992, Pat. No. 5,320,457, which is a continuation of Ser. No. 733,667, Jul. 22, 1991, abandoned.

[51] Int. Cl.$^6$ ................................... B65G 51/03
[52] U.S. Cl. ................................ 406/88; 198/445
[58] Field of Search ................... 406/86, 87, 88; 198/445

[56] References Cited

U.S. PATENT DOCUMENTS

| | | |
|---|---|---|
| Re. 32,684 | 5/1988 | Lenhart . |
| 1,900,781 | 3/1933 | Wardley ................................ 406/82 |
| 2,187,842 | 1/1940 | Rheinstrom ........................... 198/445 |
| 2,535,880 | 12/1950 | Tomkins . |
| 3,210,124 | 10/1965 | Niemi et al. .......................... 406/88 |
| 3,685,632 | 8/1972 | Brady ................................... 406/88 |
| 3,934,713 | 1/1976 | VanderMeer et al. . |
| 3,982,790 | 9/1976 | Storm et al. ........................... 406/88 |
| 4,500,229 | 2/1985 | Cole et al. . |
| 4,721,419 | 1/1988 | Lenhart . |
| 4,730,955 | 3/1988 | Lenhart . |
| 4,759,673 | 7/1988 | Pearce et al. . |
| 4,828,434 | 5/1989 | Fairman et al. . |
| 4,834,605 | 5/1989 | Jerred . |
| 4,934,508 | 6/1990 | VanderMeer et al. . |

FOREIGN PATENT DOCUMENTS

| | | | |
|---|---|---|---|
| 2507833 | 9/1976 | Germany ............................ 406/88 |
| 403256922A | 11/1991 | Japan .................................. 406/88 |

OTHER PUBLICATIONS

E. H. Halvarson, "Air Track", IBM Technical Disclosure Bulletin, vol. 15, No. 5.

Primary Examiner—Gary C. Hoge
Attorney, Agent, or Firm—Robert E. Harris

[57] ABSTRACT

A device is disclosed that utilizes a fluid (normally air) to effect nested alignment of articles such as cans to be used to package beverages and the like. A conveying section provides articles in a mass flow to an aligning section having spaced guides therein forming guideways through which articles are fluid driven downstream toward a staging section. The guides have a first portion extending parallel to the direction of intended article flow through the device and all guides except center guides have a second portion that extends downstream from the first portion at an angle with respect to the first portion to effect alignment of the articles in nested relationship at the staging section. Different groups of guides of the first portion extend upstream different distances to facilitate passage of articles into the guideways, and an embodiment is disclosed that is particularly useful in aligning undecorated cans. A plurality of readily removable top cover units preclude upward movement of the articles, and nested and aligned articles discharged from the staging area are provided to a palletizer or like apparatus.

26 Claims, 8 Drawing Sheets

Fig_1

Fig_2

DEVICE UTILIZING FLUID FOR EFFECTING NESTED ALIGNMENT OF ARTICLES AND PARTICULARLY UNDECORATED CANS

RELATED APPLICATION

This application is a continuation-in-part of U.S. patent application Ser. No. 07/999,464, filed Dec. 29, 1992, and issued as U.S. Pat. No. 5,320,457 on Jun. 14, 1994, which application was a continuation of U.S. patent application Ser. No. 07/733,667, filed Jul. 22, 1991, and now abandoned.

FIELD OF THE INVENTION

This invention relates to a device for effecting nested alignment of articles, and, more particularly, relates to such a device utilizing fluid (normally air) to urge articles, such as cans, into a nested and aligned relationship.

BACKGROUND OF THE INVENTION

It is oftentimes necessary to arrange articles in a predetermined pattern in order to effect a desired end. Such is the case, for example, where it is desired that the articles be in single file (for enabling filling of the articles, for example, where the articles are beverage cans) or be in a plurality of adjacent rows (for storing the articles, for example, on a pallet or the like).

Apparatus utilizing air conveyors for causing articles (cans), conveyed to the apparatus in a mass flow, to be arranged into single file is shown, for example, in U.S. Pat. No. 4,500,229 and U.S. Pat. No. Re. 32,684, while apparatus utilizing mechanical conveyors for arranging articles (cans) into a plurality of nested and aligned rows is shown, for example, in U.S. Pat. Nos. 4,834,605 and 2,535,880.

It is also known that article-size unoccupied spaced in a nested and aligned arrangement of articles, such as cans, can be eliminated by utilization of movable side walls at opposite sides of the rows of articles (see, for example, U.S. Pat. No. 4,934,508).

The use of air has not only been heretofore suggested to urge articles, such as cans, to be arranged in single file (as brought out above), but has also been heretofore suggested for use in urging movement of articles, such as cans, along a surface in a mass flow (see, for example, U.S. Pat. No. 4,828,434). Such arrangements utilizing fluid have not, however, been heretofore used to effect nested alignment of articles and/or to achieve nested alignment of undecorated cans.

SUMMARY OF THE INVENTION

This invention provides a device that utilizes article urging means, such as a fluid (normally air), to effect nested alignment of articles, and particularly articles having a substantially, or generally, circular cross-section. The device is particularly useful for aligning articles such as cans, and an embodiment is disclosed for aligning undecorated cans.

A conveying section provides articles in a mass flow to an aligning section having a plurality of guides, or partitions, establishing guideways through which articles are driven to a staging section where the articles are formed into a plurality of adjacent rows of nested and aligned articles. Where fluid is utilized to urge articles through one or more of the sections, the fluid is injected through apertures in base plates at each such section. A plurality of readily removable top units are provided to prevent appreciable upward movement of articles passing through the device, and the nested and aligned articles discharged from the device are normally conveyed onto a palletizer unit or the like.

It is an object of this invention to provide an improved device for effecting nested alignment of articles having a generally circular cross-section.

It is another object of this invention to provide an improved device for effecting nested alignment of articles such as cans.

It is still another object of this invention to provide an improved device for effecting nested alignment of undecorated cans.

It is still another object of this invention to provide an improved device that utilizes fluid for effecting nested alignment of articles having a generally circular cross-section.

It is still another object of this invention to provide an improved article nesting and aligning device that includes conveying, aligning and staging sections through which articles are urged.

It is still another object of this invention to provide an improved article nesting and aligning device that includes an aligning section with a plurality of particularly configured guides forming guideways and an apertured base plate for injection of fluid into the guideways to urge articles through the guideways to a staging section with the articles being in adjacent nested rows at the staging section.

It is still another object of this invention to provide an improved article nesting and aligning device utilizing fluid and having a plurality of readily removable top units.

It is yet another object of this invention to provide an improved fluid driven article nesting and aligning device used in connection with a palletizer to effect palletizing of nested and aligned articles.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Device 9 is shown in FIGS. 1 through 4 to include a receiving section 11 providing a receiving area, an aligning section 12 providing an aligning area, and a staging section 13 providing a staging area, with aligning section 12 being downstream with respect to the direction of article movement from receiving section 11, and with staging section 13 being downstream from aligning section 12 with respect to the direction of article movement.

Figure 1:
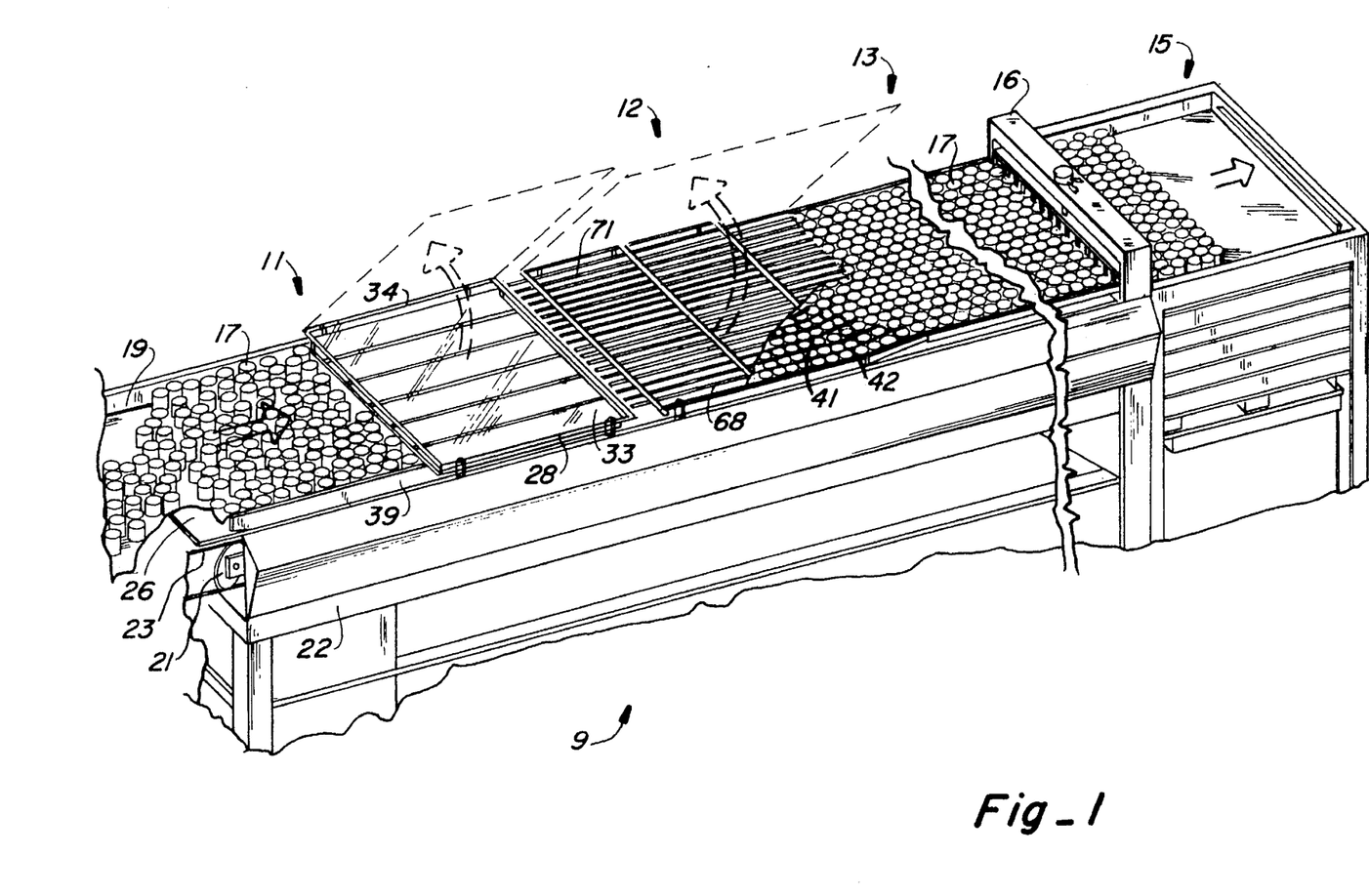
FIG. 1 is a perspective view of the device of this invention for nesting and aligning articles with the device being utilized in conjunction with a palletizer.

As also shown in FIG. 1, a palletizer 15 may be positioned adjacent to, and downstream from, staging section 13, and a stop mechanism 16 is provided to control movement of articles to the palletizer, as is conventional.

Articles 17 having a substantially, or generally, circular cross-section (such as, for example, metal cans to be filled with a beverage or the like), to be arranged in nested and aligned relationship with one another, are received at receiving section 11, and, more particularly, at conveying portion 19.

Figure 2:
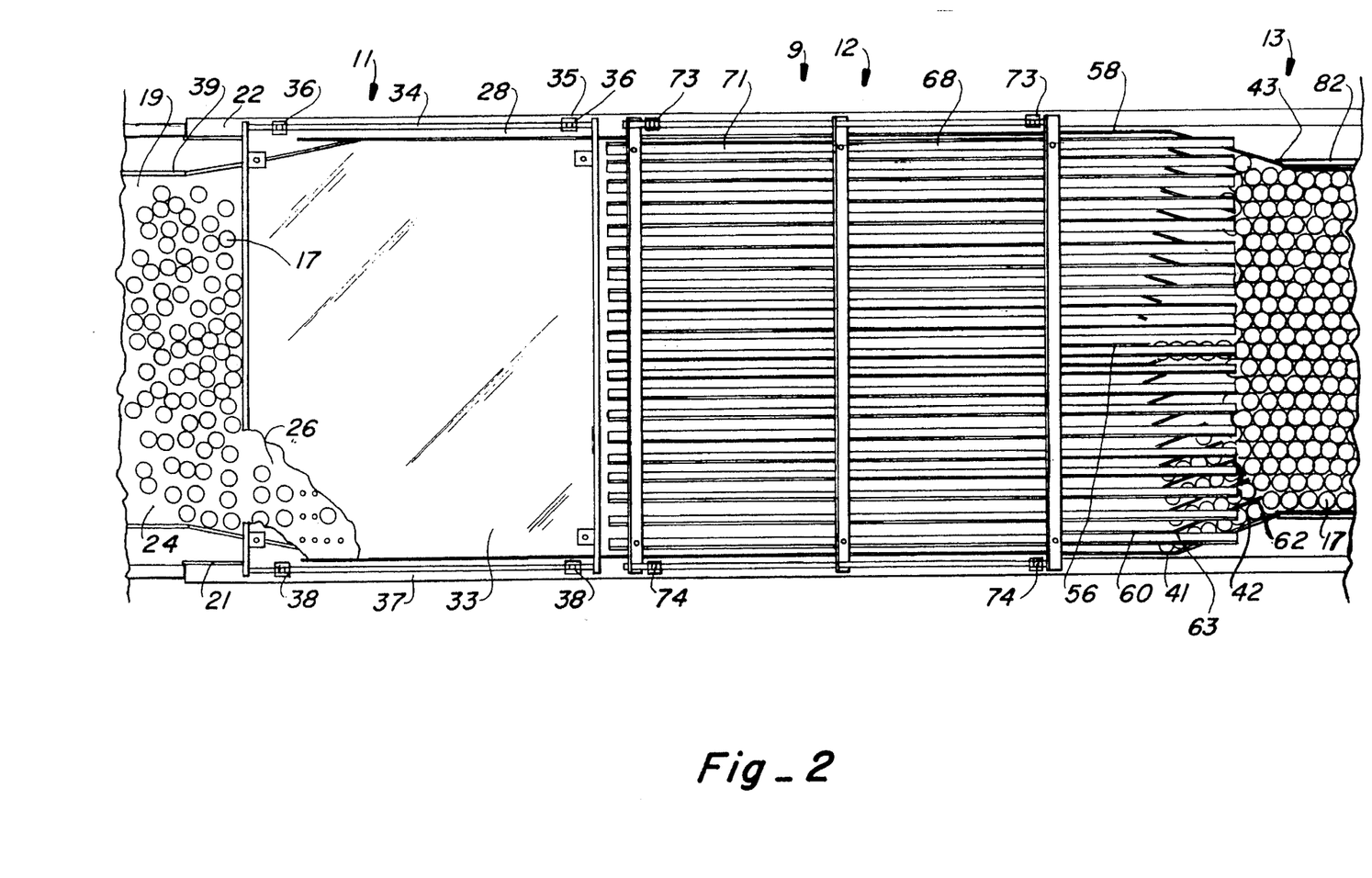
FIG. 2 is a top view of the device shown in FIG. 1.

Conveying portion 19 may be conventional and may be, for example, a mechanical conveyor having rollers 21 rotatably mounted on a support structure (generally identified by the numeral 22) with endless belt 23 carried by the rollers, one or more of which rollers is conventionally driven to cause movement of the substantially horizontally extending top surface 24 in the direction of primary intended movement of articles. Top surface 24 contacts the bottoms of received articles 17 to convey the received articles in mass toward dead plate 26 (as shown in FIGS. 1, 2 and 4) which also is a part of receiving section 11.

As shown, dead plate 26 is a substantially horizontally positioned metallic plate about twelve to sixteen inches in length (in the downstream direction) and extending entirely across the width of the device, with the dead plate being connected to supporting structure 22 at the opposite edges of the device. Dead plate 26 receives articles thereon as the articles are discharged from conveyor portion 19, with the articles being caused to slide across the dead plate due to pressure exerted by additional articles discharged from conveyor portion 19. After sliding across the dead plate, the articles are discharged onto air conveyor portion 28 which is also a part of receiving section 11.

Figure 3:
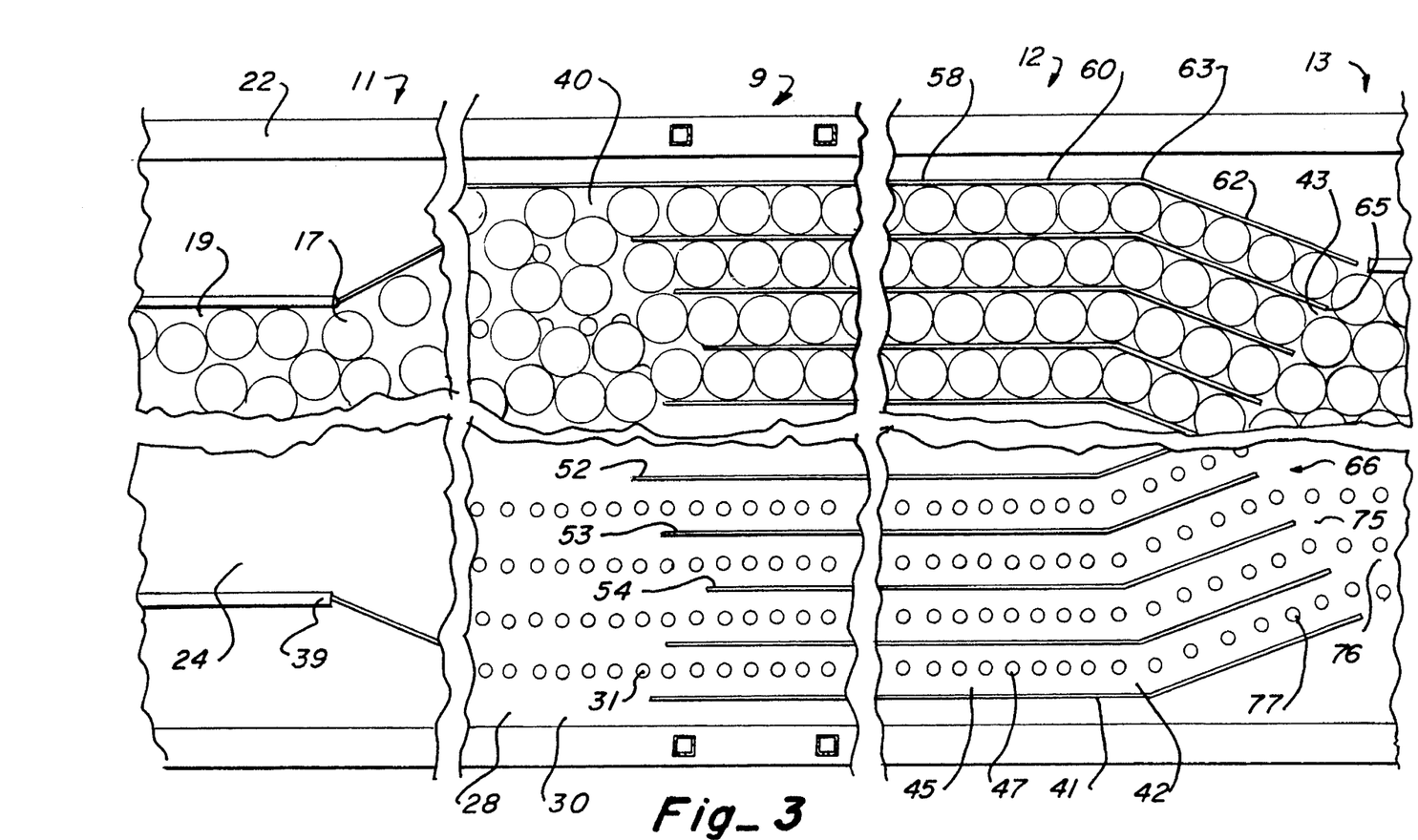
FIG. 3 is a top view of the device shown in FIG. 1 but with a reduced number of passageways illustrated and with the top units removed.
Figures 4, 5, 6:
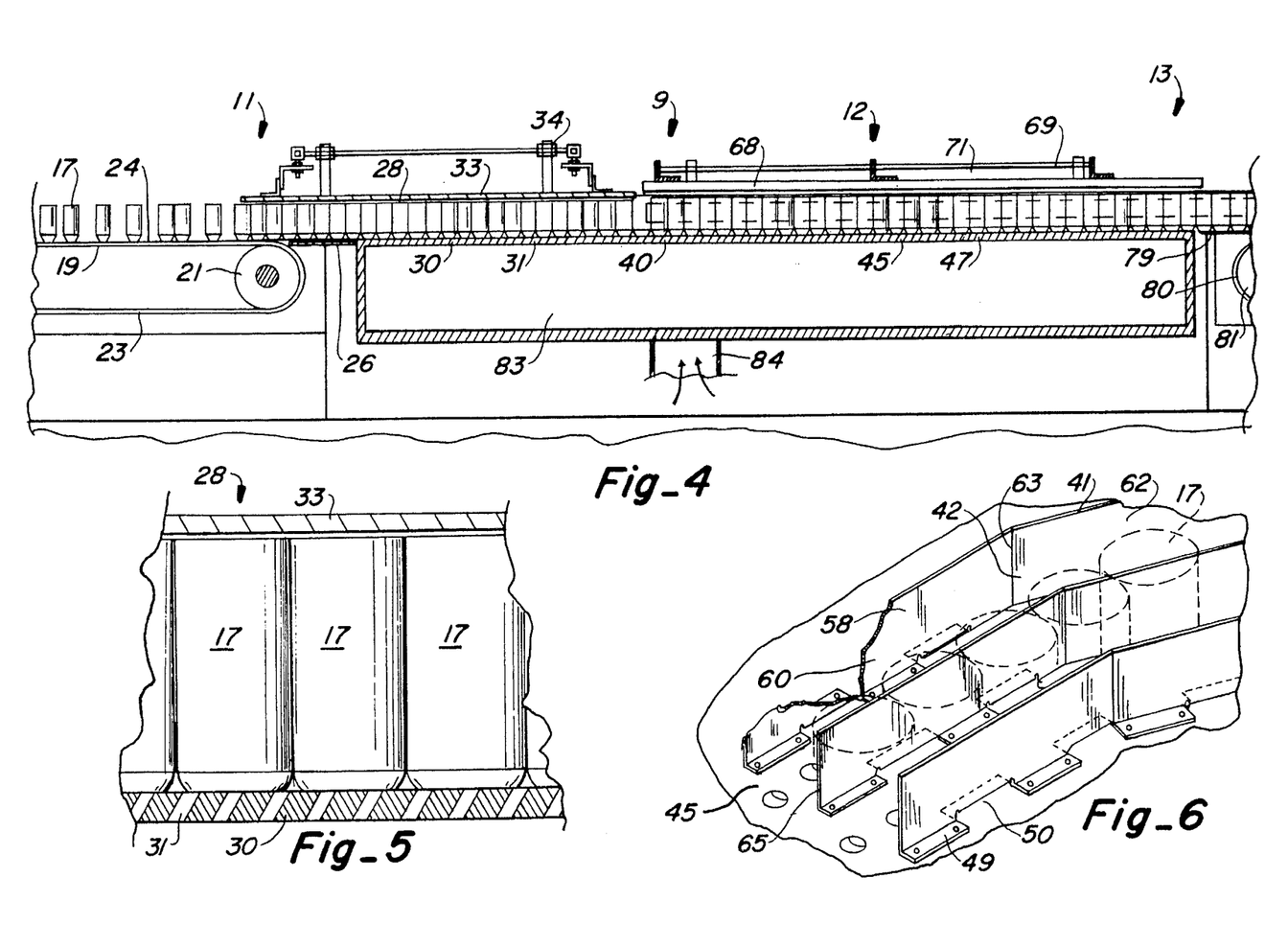
FIG. 4 is a cross-sectional side view of the device shown in FIGS. 1 and 2.
FIG. 5 is a partial cross-sectional side view of the air conveyor section illustrating positioning of the base plate and top unit relative to articles passing therebetween.
FIG. 6 is a partial perspective view of the guides, or partitions, utilized in the aligning section.

As indicated in FIGS. 3 through 5, air conveyor portion 28 includes substantially horizontally extending base plate 30 having apertures 31 formed therein. Apertures 31 are slanted so that air is injected therethrough in a downstream direction to thus urge articles in the downstream direction (i.e., away from the dead plate). While the apertures may be drilled at a slant in the base plate, the base plate with apertures therein may also be formed as shown and described in U.S. Pat. No. 4,828,434.

A solid top cover 33 is provided above dead plate 26 (preferably above the entire dead plate but at least over a portion thereof) and base plate 30. As is illustrated in FIGS. 4 and 5, top cover 33 is positioned above dead plate 26 and base plate 30 a distance slightly greater than the height of the articles to pass therebetween to thereby prevent the articles from tipping.

Top cover 33 may have ancillary structure 34 (as best shown in FIG. 4) connected therewith, is preferably connected to one side 35 of supporting structure 22 by means of hinges 36 (as shown in FIG. 2), and is releasably fastened at the other side 37 of the supporting structure by means of conventional releasable fasteners 38. When so connected, top cover 33 is positioned above and parallel to dead plate 26 and base plate 30 when fastened in operating position and may be rotated about hinges 36 to facilitate ready removal when fasteners 38 are released (as is illustrated in FIG. 1).

As indicated in FIGS. 1, 2 and 3, side plates (or rods) 39 are provided at (or near) each side of receiving section 11 to maintain the articles on the top surface 24 of belt 23, on dead plate 26, and on (or above with air injected) the top surface of base plate 30.

The articles are discharged in a mass flow from discharge end 40 of receiving section 11 into aligning section 12 where the articles are formed into a plurality of rows by guides, or partitions, 41 forming a plurality of guideways, or passageways, 42, after which the articles are discharged from discharge end 43 of aligning section 12 by rows into staging section 13. At the staging section, the rows discharged from guideways 42 are brought into adjacent positions with the articles of each row offset from one another so that the articles are thereafter in a nested relationship with the adjacent articles of each row in contact with one another and the articles of adjacent rows also in contact with one another with no article-size unoccupied spaces existing between adjacent articles.

Figure 7:
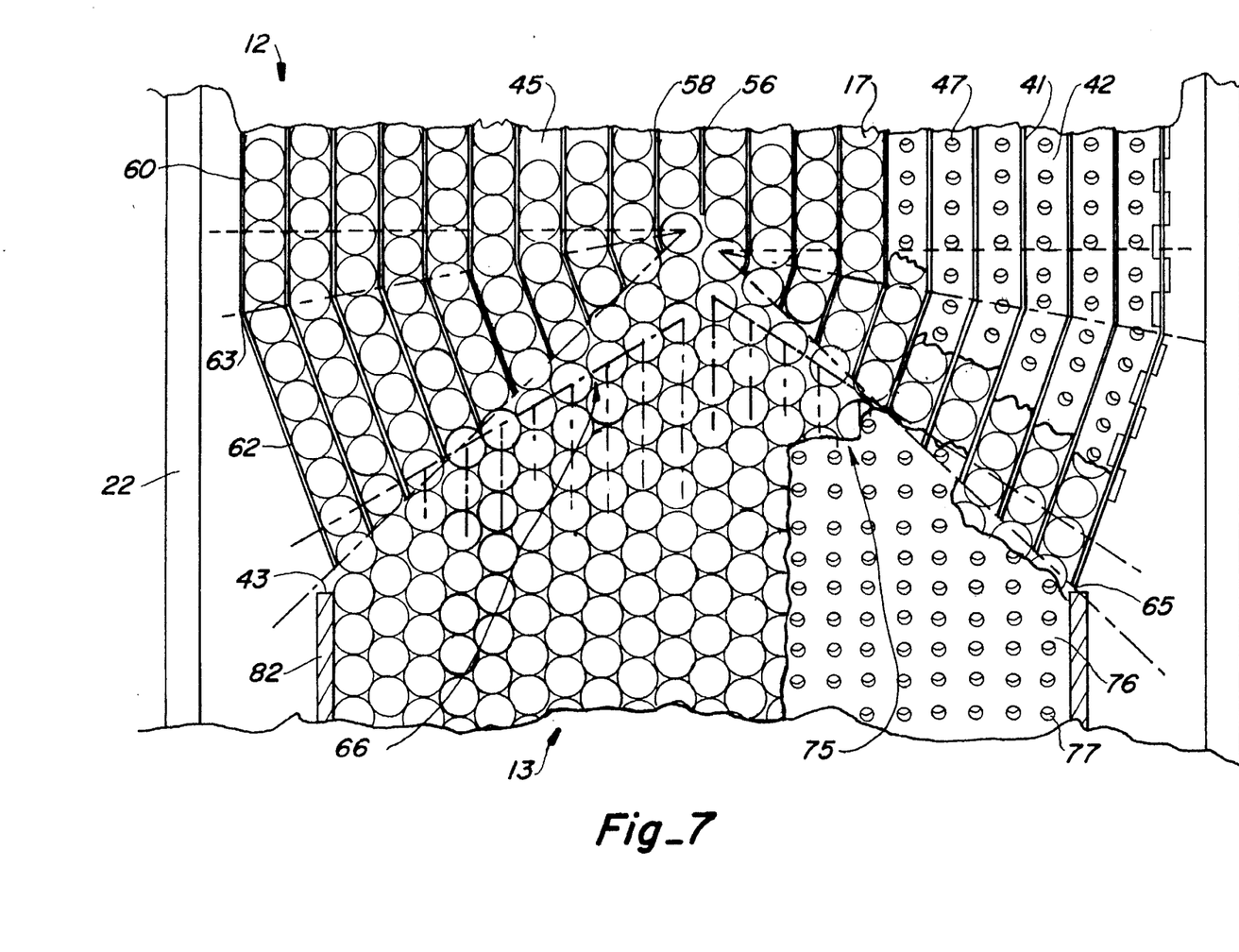
FIG. 7 is a top view with portions broken away and particularly illustrating the aligning section (including positioning of the partitions therein) and the staging section.

Aligning section 12 includes substantially horizontally extending base plate 45 having apertures 47 therein. As indicated, apertures 47 are slanted in the direction of guideways 42 (formed between guides 41) so that fluid (normally air) injected therethrough urges articles through the guideways. As indicated in FIGS. 3 and 7, apertures 47 are preferably centered in the base plate between adjacent guides. The apertures may be drilled in the base plate at a slant, but may also be formed as shown and described in U.S. Pat. No. 4,828,434.

As best shown in FIG. 6, the plurality of substantially vertically extending guides, or partitions, 41 are positioned, and attached, at oppositely directed bottom edges, or flanges, 49 and 50, to base plate 45. As also shown in FIG. 6, each partition 41 preferably has a height less than the height of articles to pass through aligning section 12 (by about one inch or more, for example), and each partition preferably has notches (not shown) therein at the bottom edge.

Partitions 41 extend upwardly from base plate 45 parallel to one another and are spaced a sufficient distance to allow articles to pass in single file in an upright position through passageways, or guideways, 42 established between adjacent partitions. Thus, for cans to be filled with a beverage (for example cans for packaging twelve ounces of the beverage), the cans are upright with the circular cross-section parallel to the base plate when passing through the guideways.

As shown in FIG. 3, partitions 41 are arranged so that each successive partition extends into receiving section 11 a different distance (or not at all) to facilitate loading of articles into the guideways. As shown, partitions 41 are thus grouped into alternate first, second and third groups 52, 53, and 54, with the partitions of first group 52 extending into receiving section 11 a distance about twice as far as do the partitions of second group 53, while the partitions of third group 54 do not extend into the receiving section.

Center partition 56 (i.e., partition 41 that is centrally partitioned) extends in a direction parallel to the primary intended direction of movement of articles in passing downstream through aligning section 12 (as best shown in FIGS. 2 and 7). The remainder 58 of the partitions (i.e., the non-centrally positioned partitions 41) have a leading portion 60 (a major portion) that extends parallel to central partition 56 (with each partition spaced from each adjacent partition by a distance slightly greater than the diameter of articles to pass through the guideways, as brought out above).

Each partition 58 also has a more downstream portion 62 that extends from junction 63 (i.e., the junction established between portions 60 and 62 of each partition 58) through aligning section 12 in a generally downstream direction but at an angle with respect to the direction of primary intended movement of articles downstream through the device, with portions 60 and 62 of each partition 58 forming an acute angle at junction 63, which angle is preferably about 20° with respect to the direction of primary intended article movement (and hence preferably about 160° with respect to portions 60 and 62).

As can be best seen from FIG. 7, junctions 63 of partitions 58 fall along a plane that extends at an acute angle with respect to the downstream extension of the plane formed by central partition 56 (and hence at an angle from the primary intended downstream direction of movement of articles) at an angle of about 80°.

Portions 62 of partitions 58 extend a distance greater than does central partition 56 and each successive outwardly spaced portion 62 of partition 58 progressively terminates at free end 65 positioned at a greater distance downstream, with the free ends 65 of the partitions terminating in a plane that extends at an acute angle of about 45° in each direction with respect to the downstream extension of the plane formed by central partition 56 so that the free ends of the partitions form a discharge end 43 of aligning section 12 having a V-shape (therefore, staging section 13 may also be considered to have a V-shape input end 66 as best shown in FIGS. 3 and 7).

As shown in FIG. 7, partitions 58 extending in one direction (relative to the width of the aligning section) from central partition 56 have junctions 63 that are offset in the downstream direction one-half of the total diameter of the article with respect to partitions 58 extending the opposite direction so that rows of articles discharged from the guideways at opposite sides of center partition 56 are offset from one another by one-half of the distance of the articles when discharged into staging section 13. The number of partitions utilized depends upon the number of rows of articles needed. When used with a palletizer, for example, twenty rows may be utilized with twenty-one cans in each row.

A top unit 68 with ancillary structure 69 (as shown in FIG. 4) also has a plurality of uniformly spaced L-shaped bars 71 extending lengthwise (i.e., in the downstream direction of article movement) parallel to and spaced from one another with one leg of each bar extending across the top of each guideway 42. Top unit 68 is fastened to side 35 of supporting structure 22 by means of hinges 73 and fastened to the other side 37 of the supporting structure by means of readily releasable fasteners 74. When in operating position above and parallel to base plate 45, the bottom surface (provided by bars 71) of top unit 68 is slightly above the top portion of articles to pass through the guideways of the aligning section (top unit 68 is about one inch from the top edges of partitions 41).

Staging section 13 has an air conveyor portion 75 (including the V-shape input end 66) that includes base plate 76 with apertures 77 therein slanted in the downstream direction. Again, apertures 77 may be drilled at a slant, but may also be formed as shown in U.S. Pat. No. 4,828,434. As indicated in FIG. 2, top unit 68 also preferably covers the portion of staging area 13 having base plate 76 (base plate 76 may be an extension of base plate 45 of aligning section 12).

As also shown in FIG. 4, staging section 13 preferably also includes conventional mechanical conveyor 79 positioned downstream from and adjacent to base plate 76 to receive articles discharged from air conveyor portion 75 of the staging section. Conveyor 79 can be conventionally implemented by endless belt 80 carried around rollers 81 (one or more of which may be conventionally driven) to receive the nested and aligned articles from the air conveyor portion 75 and convey the articles to a utilization unit such as palletizer 15 (in a manner as shown, for example, in U.S. Pat. No. 4,759,673). Side walls, or rods, 82 are provided at (or near) the sides of staging area 13 to maintain the articles on (or above with air injected) base plate 76 and belt 80. As is conventional, conveyor 79 may be of sufficient length to convey sufficient articles to fill one or more pallets and stop mechanism 16 (such as shown, for example, in U.S. Pat. No. 3,934,713) allows only enough articles to pass each time to fill a pallet.

Plenum, or chamber, 83 (shown in FIG. 4) is formed below the base plates (which, of course, could be implemented as a common base plate) to supply fluid (normally air), under pressure, through the apertures in the base plates. While not specifically shown, it is to be realized that plenum 83 is supplied with fluid from an external source, such as, for example a conventional blower through conduit 84.

In operation of the device as shown in FIGS. 1 through 7, articles supplied to receiving section 11 (which articles may, for example, by conveyed to the receiving section from a can decorating unit) are conveyed in a mass flow through the receiving section and discharged therefrom into the aligning section where the articles are automatically separated and urged in single file through the guideways. The articles are discharged from the guideways into the staging area where the articles are automatically brought into adjacent aligned rows with the aligned rows being in offset adjacent relationship so that the articles in each row are brought into nested relationship with each article in contact with adjacent articles in the row and also in contact with adjacent articles in adjacent rows with substantially no can-size unoccupied spaces between adjacent articles. The thus nested and aligned articles are then conveyed in the downstream direction from the device.

Device 87, as shown in FIGS. 8 through 12, is an alternate embodiment of this invention that is particularly well suited for effecting nested alignment of undecorated cans and particularly undecorated cans known as brite, or bright, cans that have a high coefficient of friction. Such cans may be, for example, cans that have just been subjected to an acid cleaning bath and are ready for decoration.

Figure 8:
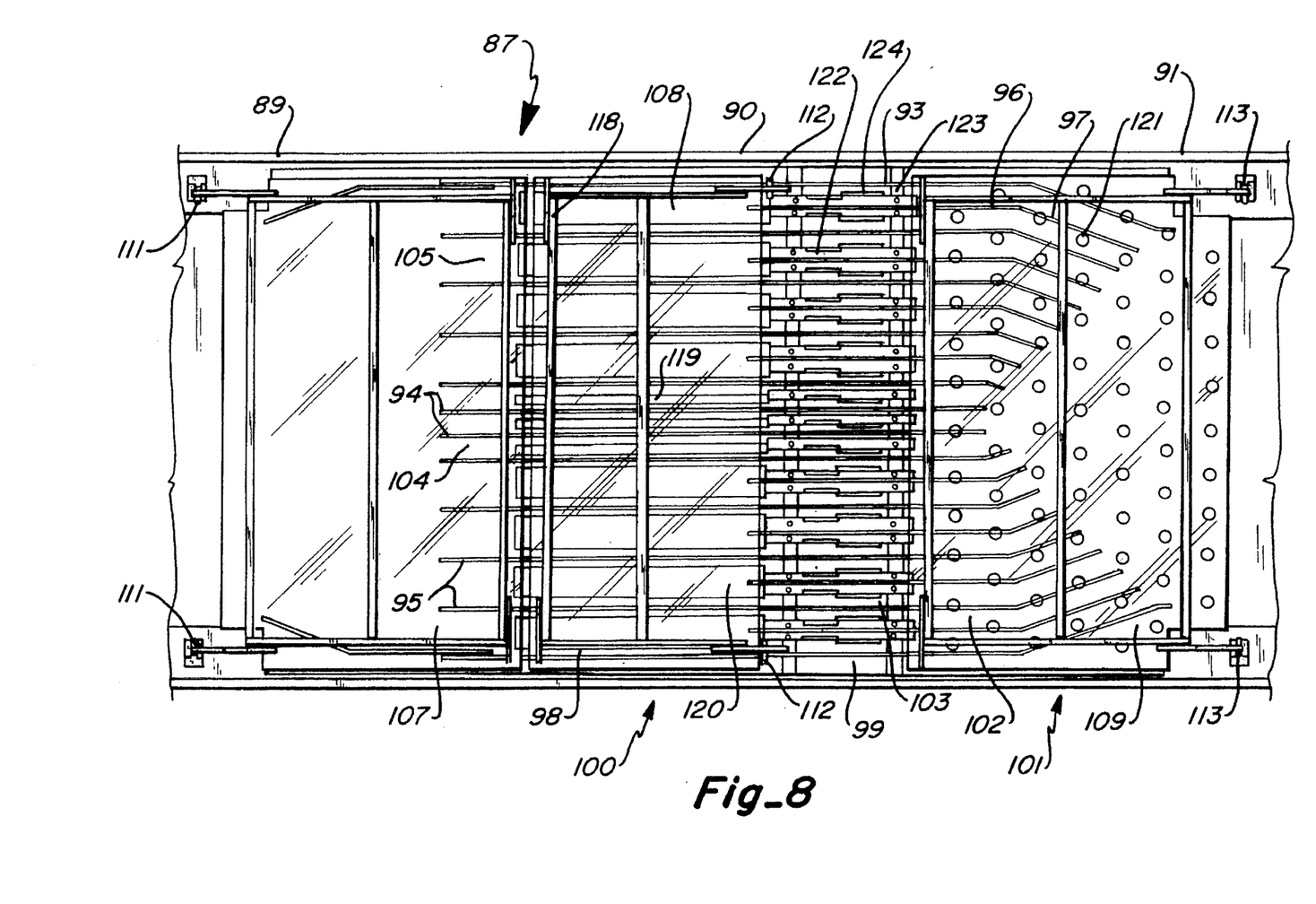
FIG. 8 is a top view illustrating an alternate embodiment of the device of this invention that is particularly well suited for effecting nested alignment of undecorated cans.

Device 87 developed from device 9 shown in FIGS. 1 through 7 with changes thereto being made as brought out hereafter. As best shown in FIG. 8, device 87 includes a receiving section 89 to receive incoming cans to be aligned, an aligning section 90, and a staging section 91 from which cans in nested alignment are discharged. Receiving section 89 and staging section 91 are essentially the same as receiving section 11 and staging section 13 as described above with respect to device 9 as shown in FIGS. 1 through 7, and operate in essentially the same manner.

Aligning section 90 includes a plurality of guides 93 that are similar to guides 41 described above with respect to device 9 as shown in FIGS. 1 through 7, but guides 93 are configured in a different manner as brought out hereafter. As shown in FIG. 8, guides 93 include a pair of center guides 94 and a plurality of other guides 95 with guides 95 being outwardly spaced from center guides 93 across the entire width of the aligning section, and each of center and other guides 94 and 95 (collectively referred to as guides 93) has a first portion, or section, 96 extending parallel to the intended path of travel of articles through the device with guides 95 also having a second portion, or section, 7 extending downstream from the first section and angled inwardly (toward center guides 94) in the same manner as described above with respect to guides 58 of device 9 to accomplish the same end (i.e., to effect nested alignment of the articles at the staging section).

The first portion of guides 93 extend through upstream area, or section, 98 and middle area, or section, 99 of the upstream part, or section, 100 of aligning section 90 (upstream area 98 is within an area referred to as a part Of receiving section 11 in connection with device 9 shown in FIGS. 1 through 7), and through the downstream part, or section, 101 of aligning section 90 to the junction with the second portion of the guides. A first group of guides 93 (including center guides 94 and every other one of outwardly spaced guides 95) extend through upstream area 98 while all of guides 93 extend through middle area 99.

Guideways are thus formed between each adjacent pair of guides 93, with guideways 102 being established by guides 93 through downstream part 101 of aligning section 90 and guideways 103 are established by guides 93 through middle area 99 of upstream part 100 of aligning section 90 so that the cans pass through guideways 102 and 103 in single file. In upstream area 98 of upstream part 100 of aligning section 90, however, while center guides 94 and the guides 95 immediately adjacent to the center guides are spaced from one another to establish guideways 104 that pass cans in single file, the remainder of the guides 95 that extend through the upstream area 98 are spaced from one another a distance twice as great as the spacing between the center guides 94 (since every other one of the guides 95 terminate at the junction of upstream area 98 and middle area 99) to thereby establish guideways 105 that pass cans in multiple, and, more specifically, double file.

Thus, at upstream area 98, three centrally positioned single file guideways 104 are established along with a plurality of multiple file guideways 105 established at opposite sides of guideways 104. As specifically shown in FIG. 8, four guideways 105 are established at each side of the three guideways 104 utilizing two center guides 94 and nine guides 95 at each side of center guides 94 with five of the nine guides extending through upstream area 98. It is to be realized, however, that the number of center and other guides 94 and 95 can be varied to vary the number of guideways as needed.

Figure 9:
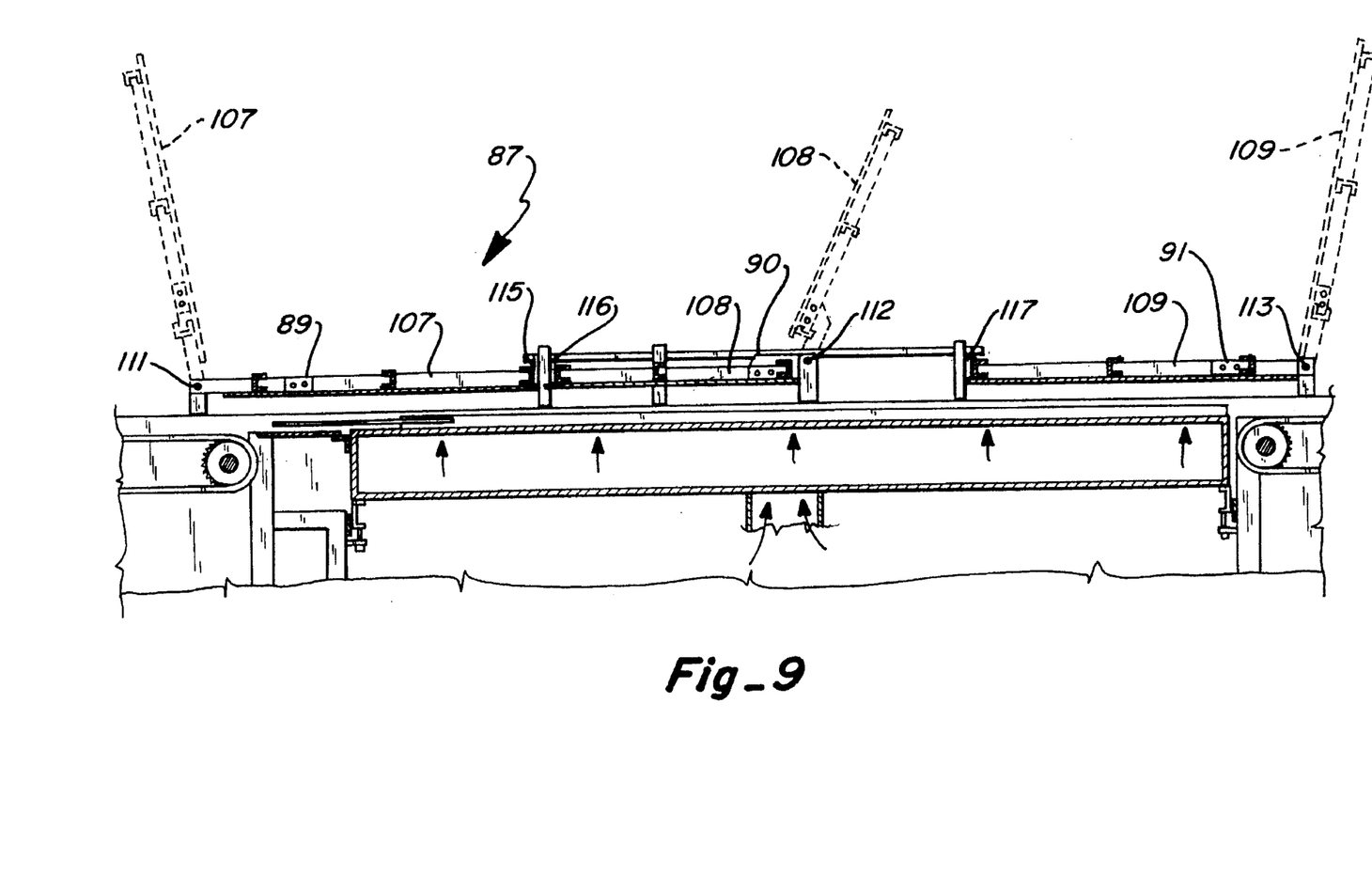
FIG. 9 is a side view of the embodiment of the device as shown in FIG. 8 and illustrating the plurality of removable top sections shown in FIG. 8 in open position by dotted lines.

As shown in FIGS. 8 and 9, three top cover units 107, 108 and 109 are preferably utilized, with top cover unit 107 being positioned over receiving section 89 and a portion of upstream area 98 when in operating position, with top cover unit 108 being positioned over the portion of upstream area 98 not covered by top cover unit 107 when both are in operating position, and with top cover unit 109 being positioned over the downstream part of aligning section 90 and staging section 91 when in operating position.

Top cover units 107, 108 and 109 rotate about hinges 111, 112 and 113, respectively, so that the top cover units open and close in directions having a component parallel to the intended path of travel of articles through the device with top cover unit 107 rotating in the downstream direction in being moved from the open position (as shown by dotted lines in FIG. 9) to the closed, or operating, position (as shown by solid lines in FIGS. 8 and 9), and with top cover units 108 and 109 rotating in the upstream direction in being moved from the open position (as also shown by dotted lines in FIG. 9) to the closed, or operating, position (as also shown by solid lines in FIGS. 8 and 9). Releasable fasteners 115, 116 and 117 may also be provided to maintain top cover units 107, 108 and 109, respectively, in the operating position until released.

Top cover unit 107 is preferably solid, while top cover unit 108 includes a plurality of panels, or solid cover sections, mounted on bars 118, with narrower panels 119 extending lengthwise over the guideways 104 while wider panels 120 extend over guideways 105. As best shown in FIG. 8, the three panels extending over guideways 104 and the eight panels extending over guideways 105 are narrower than the guideways to thus provide space at each side above the guides establishing the guideways to allow air to escape.

Top cover unit 109 is preferably a solid cover with apertures 121 uniformly spaced over the entire cover (apertures 121 may be, for example, one inch in diameter with the apertures spaced from one another three inches center-to-center and with the apertures nearest the sides of the cover unit being one and one-half inches from the edge of the unit, it being realized, however, that the spacing and/or sizes may be altered as needed).

The area between top cover units 108 and 109 (when in the operating position (i.e. the area between middle area 99 of aligning section 90 where cans pass through guideways 102 in single file) has a plurality of narrow bars 122 mounted on supporting cross bars 123 thereat so that each bar 122 is positioned at one side, and above, guideway 103, and each bar has a can sensor 124 mounted thereon. Each can sensor 124 has a tongue extending into the associated guideway 103 to sense can presence in the guideway and to indicate if can presence is not detected.

Figure 10:
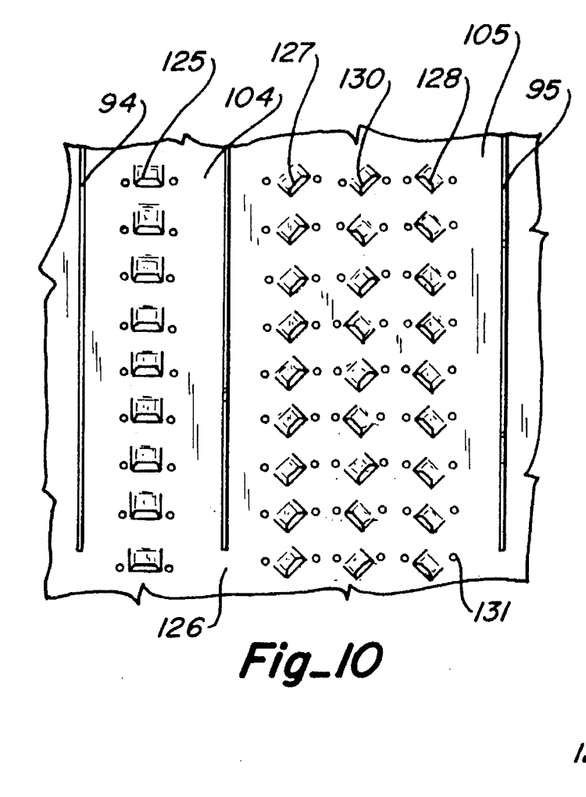
FIG. 10 is a partial view of a portion of the base plate at the upstream area of the aligning section as shown in FIG. 8 and illustrating the positioning of the apertures and direction of air flow therefrom.

Apertures 125 are provided in base plate 126 below each of the guideways establishing single file can passages (including guideways 104 at the upstream area 99 of aligning section 90 as shown in FIG. 10) to direct fluid (normally air) from the plenum below the base plate downstream through the guideways in the same manner as brought out above with respect to device 9 shown in FIGS. 1 through 7 to thereby urge articles through the guideways.

In multiple guideways 105 at upstream area 98, however, three rows of apertures 125 are provided in each guideway, with the apertures of outer rows 127 and 128 directing the fluid downstream and outwardly at an angle away from center aperture row 130, with every other one of the apertures of center row 130 directing the fluid downstream and outwardly in the same direction as do the apertures of outer row 127, and with the alternate ones of the apertures of center row 130 directing the fluid downstream and outwardly in the same direction as does the apertures of outer row 128, as shown in FIG. 10. The acute angle of each aperture of aperture rows 127, 128 and 130 is about forty-five degrees with respect to a line extending in the direction of each row, and small apertures 131 may be provided in each of the guideways 104 and 105 to direct air upwardly to lift cans passing through the guideways.

Figure 11:
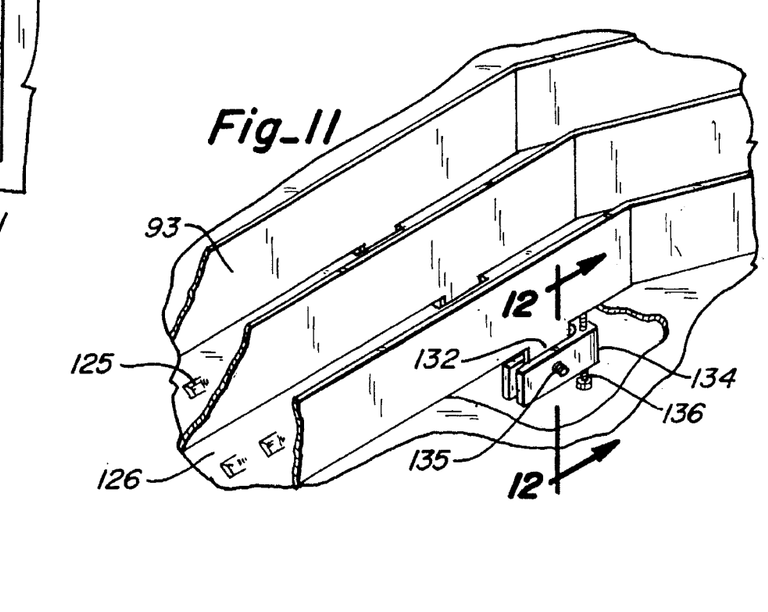
FIG. 11 is a partial perspective view similar to that of FIG. 6 but showing an alternate, and now preferred, attachment of the guides below the base plate.
Figure 12:
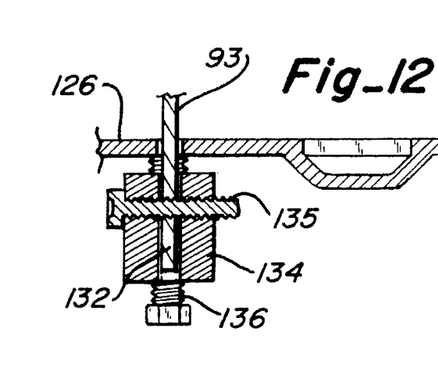
FIG. 12 is a section view taken through lines 12—12 of FIG. 11.

To provide greater rigidity to the deck plate and guides, it has been found preferable to fasten guides 93 in a manner different from the fastening arrangement for guides 41 of device 9. As shown in FIGS. 11 and 12, guides 93 include flanges 132 that extend through notches in base plate 126 with the guides being secured by releasable fasteners 134 engaging flanges 132 below the base plate. Each fastener 134 has a bolt 135 extending through flange 132 to secure fastener 134 against flange 132 on the bottom side of the base plate, and a tension screw 136 is provided through fastener 134, with screw 136 being then tightened to apply pressure to the bottom of the base plate thereby drawing guide 93 securely to the base plate. Fastener 134 is positioned at various points along each guide to securely maintain the guide in position until tension screw 136 is released.

In operation, device 87 operates in basically the same manner as does device 9 as shown in FIGS. 1 through 7, except that it has been found, particularly for undecorated cans, that providing a multiple guideway area with diverse fluid input upstream from the single file guideway area enhances the movement of cans from the receiving section 89 into and through aligning section 90, resulting in an enhanced nested alignment, particularly when operating at high can flow speeds, and that utilization of configured multiple top cover units both facilitates alignment and readily allows clearance of blocks which may be caused, for example, by tipped cans.

In view of the foregoing, it is to be appreciated that this invention provides an improved device for effecting nested alignment of articles, including undecorated cans.

What is claimed is:

1. A device for effecting nested alignment of articles having a generally circular cross-section, said device comprising:

conveying means for receiving articles having a generally circular cross-section and providing said articles at a discharge end;

aligning means adjacent to said discharge end of said conveying means for receiving articles discharged from said conveying means, said aligning means having guide means in first and second areas with said guide means establishing a plurality of guideways in each of said first and second areas and with a portion of preselected ones of said guide means extending at an angle with respect to the remainder of said guide means to effect converging of articles discharged from said guideways, said first area being located longitudinally adjacent said second area in a downstream direction of said device, said guideways in first area having a width sufficient to enable articles to move through said guideways in single file and said guideways in said second area including a first group of said guideways having a width sufficient to enable articles to move through said first group of guideways in single file and a second group of said guideways having a width sufficient to enable articles to move through said second group of guideways in multiple file, said second group of guideways being located laterally adjacent said first group of guideways in a direction normal to said downstream direction;

staging means for receiving articles discharged from said aligning means; and article urging means for urging articles in said downstream direction through said guideways and into said staging means with the articles discharged from said guideways providing a plurality of separate adjacent rows of articles at said staging means and with the articles of said adjacent rows being offset from one another such that the articles are in nested relationship with each article contacting adjacent articles in the same and adjacent rows.

2. The device of claim 1 wherein said plurality of guideways in said second area of said aligning means also includes a third group of said guideways having a width sufficient to enable articles to move through said third group of guideways in multiple file, and wherein said first group of said guideways is located laterally between said second and third groups of said guideways.

3. The device of claim 2 wherein said second and third groups of said guideways have a width sufficient to enable articles to move through said second and third groups of said guideways in double file.

4. The device of claim 2 wherein said first group of said guideways includes three guideways, and wherein each of said second and third groups of said guideways includes four guideways.

5. The device of claim 2 wherein said aligning means includes a base plate having apertures therein, and wherein said article urging means includes means for urging fluid through said apertures in said base plate to urge articles through said guideways toward said staging means, said base plate having plural apertures opening into said second and third groups of said guideways in said second area with said plural apertures being angled with respect to a longitudinal direction of said second and third groups of said guideways to thereby direct fluid at different angles into said second and third groups of said guideways.

6. The device of claim 5 wherein said apertures in said base plate opening into said second and third groups of said guideways include multiple rows of apertures with alternate ones of at least one of said rows of apertures being alternately directed at different angles with respect to said longitudinal direction of of said second and third groups of said guideways.

7. The device of claim 6 wherein said apertures in said base plate opening into said second and third groups of said guideways include three spaced rows of apertures, and wherein the middle one of said three spaced rows of apertures includes said alternately directed apertures.

8. The device of claim 1 wherein said guide means includes a plurality of guides each of which extends through said first area of said aligning means and selected ones of which extend through said second area of said aligning means.

9. The device of claim 8 wherein said plurality of guides includes a first group of centrally positioned guides extending through said first and second areas to establish movement of articles through said first and second areas in single file, and second and third groups of guides positioned at opposite sides of said first group with said guides of said second and third groups extending through said first area and alternate ones of said guides of said second and third groups extending through said second area to establish movement of articles through said guideways in multiple file between said extended ones of said second and third groups of guides.

10. The device of claim 1 wherein said device includes top cover means extending over at least said aligning means, and hinge means connected with said top cover means for allowing said top cover means to be rotated about said hinge means in a manner such that said top cover means rotates in directions having a component parallel to the primary intended direction of article movement through said device.

11. The device of claim 10 wherein said top cover means includes first and second top covers extending over said aligning means with said first and second top covers being connected with said hinge means to rotate in opposite directions when removed from an operating position covering said aligning means.

12. The device of claim 11 wherein said first and second top covers extend over said second area of said aligning means when in operating position, wherein said first top cover is solid, and wherein said second top cover includes a plurality of panels spaced from one another and extending along the direction of primary intended article travel through said device.

13. The device of claim 12 wherein said panels include first panels having a width to partially cover said guideways establishing single file movement of articles and second panels having a width greater than the width of said first panels to partially cover said guideways establishing multiple file movement of articles.

14. The device of claim 11 wherein said aligning means also includes a downstream section, and wherein said top cover means includes a third top cover spaced from said first and second top covers and extending over said downstream section of said aligning means.

15. The device of claim 14 wherein said third top cover is a solid sheet having a plurality of apertures therein substantially uniformly spaced throughout said sheet.

16. A device for effecting nested alignment of articles having a generally circular cross-section, said device comprising:

conveying means for receiving articles having a generally circular cross-section and providing said articles at a discharge end;

aligning means adjacent to said discharge end of said conveying means for receiving articles discharged in a downstream direction from said conveying means, said aligning means having first and second sections and including guide means in each said section for establishing a plurality of guideways each of which has a width sufficient to enable articles to move through said guideways in a predetermined file, and a portion of preselected ones of said guide means extending at an angle with respect to the remainder of said guide means to effect converging of articles discharged from said guideways;

first top means positioned slightly above articles when at said first section of said aligning means so that when so positioned said first top means is contactable by the top portion of said articles as said articles move through said first section of said aligning means below said first top means;

second top means separate from and positioned downstream from said first top means, said second top means having a configuration such that fluid passage therethrough is dissimilar to that of said first top means with said second top means being positioned slightly above articles when at said second section of said aligning means so that when so positioned said second top means is contactable by the top portion of said articles as said articles move through said second section of said aligning means below said second top means;

staging means for receiving articles discharged in a downstream direction from said guideways of said aligning means; and fluid directing means adapted to direct fluid into said guideways to urge movement of articles through said guideways and into said staging means with the articles discharged from said guideways providing a plurality of separate adjacent rows of articles at said staging means and with the articles of said adjacent rows being offset from one another such that the articles are in nested relationship with each article contacting adjacent articles in the same and adjacent rows.

17. The device of claim 16 wherein said device includes hinge means for hinging said first and second top means so that said first and second top means rotate in directions having a component parallel to the primary intended direction of article movement through said device.

18. The device of claim 17 wherein said first and second top means rotate in opposite directions in being moved from an operating position covering said aligning means.

19. The device of claim 18 wherein said first top means is solid and said second top means includes a plurality of spaced panels extending parallel to the primary intended direction of article flow through said device.

20. The device of claim 16 wherein said device includes a third top means separate from and positioned downstream from said second top means.

21. The device of claim 20 wherein said device includes additional hinge means, and wherein said third top means rotates about said additional hinge means so that said third top means rotates in directions having a component parallel to the primary intended direction of article movement through said device.

22. The device of claim 20 wherein said third top means includes a plurality of apertures spaced from one another and extending over substantially the entire third top means.

23. A device for effecting nested alignment of undecorated cans, said device comprising:

conveying means for receiving undecorated cans and providing said undecorated cans at a downstream discharge end;

aligning means adjacent to said discharge end of said conveying means for receiving undecorated cans discharged from said conveying means, said aligning means including upstream and downstream sections with said upstream section having first and second areas with said first area being downstream from said second area, said first area having a plurality of guides therein for establishing a plurality of guideways each of which has a width sufficient to enable articles to pass through said guideways in single file and said second area having a plurality of guides therein for establishing a first plurality of guideways having a width sufficient to enable articles to pass through said first plurality of guideways in double file and a second plurality of guideways having a width sufficient to enable articles to pass through said second plurality of guideways in single file, said second plurality of guideways being located laterally adjacent said first plurality of guideways in a direction normal to said downstream direction, said aligning means also including a base plate having apertures therein with said apertures opening into said guideways of said first and second areas of said aligning means, said guideways having a width sufficient to enable articles to pass through said guideways in double file including a plurality of rows of said apertures extending along the primary intended path of movement of articles passing through said aligning means and being angled with respect to said primary intended path of movement of articles passing through said aligning means, and said downstream section of said aligning means having a plurality of guides therein for establishing a plurality of guideways in said downstream section with a portion of preselected ones of said guides extending at an angle with respect to the remainder of the guides to effect converging of articles discharged from said guideways in said downstream section;

staging means for receiving articles discharged from said downstream section of said aligning means; and fluid supplying means communicating with said apertures in said base plate of said aligning means for supplying fluid to said guideways through said apertures to thereby cause movement of cans through said guideways to said staging means to form adjacent rows of cans at said staging means with the cans of adjacent rows being offset from one another such that the cans are in nested relationship with each can contacting adjacent articles in the same and adjacent rows such that no can-size spaces are left therebetween.

24. The device of claim 23 wherein said apertures in said first plurality of guideways include three rows of apertures with first and second rows being adjacent to said guides forming said first plurality of guideways and a third row of apertures being between said first and second rows of apertures with fluid supplied through said rows of apertures into said first plurality of guideways being at an acute angle with respect to a longitudinal direction of said first plurality of guideways in said second area to direct fluid downstream and toward said guides forming said first plurality of guideways.

25. The device of claim 24 wherein said rows of apertures direct fluid into said first plurality of guideways at an angle of about forty-five degrees with respect to said longitudinal direction of said first plurality of guideways in said second area.

26. The device of claim 24 wherein said apertures of each of said first and second rows of apertures direct said fluid into said first plurality of guideways at substantially the same angle, with the angle of directed fluid of said first row of apertures being opposite to that of said angle of directed fluid of said second row of apertures, and wherein said apertures of said third row of apertures direct said fluid into said first plurality of guideways alternately at the angle of said apertures of said first and second rows of apertures.

* * * * *